United States Patent
Long et al.

[19]

[11] Patent Number: 5,964,483
[45] Date of Patent: Oct. 12, 1999

[54] FLUID COUPLING ASSEMBLY, LOCKING MEMBER THEREFOR, AND METHOD OF ASSEMBLY

[75] Inventors: Gary R. Long; Richard W. Moss; David R. C. Raines, all of Worcestershire; Paul A. Tromans, West Midlands, all of United Kingdom

[73] Assignee: Dayco Products, Inc., Dayton, Ohio

[21] Appl. No.: 08/971,883

[22] Filed: Nov. 19, 1997

[51] Int. Cl.⁶ ............................................. F16L 37/12
[52] U.S. Cl. ........................... 285/305; 285/369; 29/428
[58] Field of Search .................. 285/305, 369; 403/292, 294, 155; 411/300, 522; 29/428; 24/541, 522

[56] References Cited

U.S. PATENT DOCUMENTS

| | | | |
|---|---|---|---|
| 3,154,237 | 10/1964 | Rothschild | 285/305 X |
| 3,527,485 | 9/1970 | Goward et al. | 285/305 |
| 3,628,768 | 12/1971 | Hutt | 251/148 |
| 3,973,791 | 8/1976 | Porta et al. | 285/305 |
| 4,059,295 | 11/1977 | Helm | 285/305 |
| 4,423,892 | 1/1984 | Bartholomew | 285/319 |
| 4,431,218 | 2/1984 | Paul, Jr. et al. | 285/305 |
| 4,558,842 | 12/1985 | Peil et al. | 285/305 X |
| 4,707,262 | 11/1987 | Murken | 210/448 |
| 4,923,350 | 5/1990 | Hinksman et al. | 411/457 |
| 5,000,614 | 3/1991 | Walker et al. | 403/326 |
| 5,405,175 | 4/1995 | Bonnah et al. | 285/305 |
| 5,573,280 | 11/1996 | Salter et al. | 285/305 X |

FOREIGN PATENT DOCUMENTS

| | | | |
|---|---|---|---|
| 569915 | 11/1975 | Switzerland | 285/305 |

*Primary Examiner*—Dave W. Arola
*Attorney, Agent, or Firm*—Joseph V. Tassone

[57] ABSTRACT

A quick connect-disconnect fluid coupling assembly having cylindrical outer and inner coupling members, one of which is connected to a conduit and the other to a fluid conveying system. The assembly is accomplished by inserting a U-shaped locking member having a bight and two parallel legs into the outer member, which has a peripheral groove receiving the bight so that the curved portion thereof does not extend beyond the periphery. Slots in this member receive the legs, which are then locked around grooves in the inner member and the ends of the legs do not extend beyond the periphery of the outer member. The outer portion of the bight is thinner than the inner portion to permit easy insertion into, and withdrawal from, the groove of the outer member. The system may also be utilized in an assembly of three or more components, wherein two or more locking members are used.

31 Claims, 3 Drawing Sheets

FLUID COUPLING ASSEMBLY, LOCKING MEMBER THEREFOR, AND METHOD OF ASSEMBLY

BACKGROUND OF THE INVENTION

1. Field of the Invention

This invention is directed to a quick connect-disconnect coupling composed of at least two coupling members. One of the members is capable of being attached to a conduit for conveying fluid, and the other member to another part of the fluid conveying system.

2. Prior Art Statement

Quick connect-disconnect couplings used in the field of fluid conveying are known in the art. These are useful where rapid coupling and uncoupling of the system are required, while at the same time providing a high degree of safety during both flow and non-flow conditions. The use of various types of sealing members such as O-Rings is known for such purpose. One of the designs that has been utilized involves the use of a U-shaped retaining pin with legs that are adapted to be inserted into portions of a first and a second coupling member, thus frictionally interlocking the members. Unlocking may easily be accomplished by removing the pin. The following patents show how this concept has been utilized:

| U.S. Pat. No. |  | INVENTOR |
|---|---|---|
| 3,527,485 |  | GOWARD et al. |
| 3,628,768 |  | HUTT |
| 3,973,791 |  | PORTA et al. |
| 4,423,892 |  | BARTHOLOMEW |
| 4,431,218 | (DIV. 4,811,975) | PAUL et al. |
| 4,707,262 | (DIV. 4,806,248) | MURKEN |
|  | (DIV. 4,894,156) |  |
| 4,923,350 |  | HINKSMAN et al. |
| 5,000,614 |  | WALKER et al. |

These patents all disclose the concept of using a locking or retaining member, also referred to as "pins" or "staples" for interconnecting coupling members so as to permit quick coupling and release.

SUMMARY OF THE INVENTION

Although the prior art devices utilize the same general principal as the present invention, they have certain deficiencies. For example, the U-shaped bights and the legs extend beyond the outer peripheral surface of the outer member which may create interference with the adjacent parts of the system. Also, the locking members are formed with curved or serrated portions to ensure that they remain locked in place if accidentally struck. Further, the prior art devices are formed to fit snugly within the slots, thus making removal more difficult.

The present invention overcomes these problems firstly by the flush placement of the locking member relative to the outer coupling, so that there are no protruding parts to create hazards in the system. Secondly, the bight has greater surface area than the prior art devices, thus providing a greatly increased bearing surface between the locking member and the sides of the groove which has been formed in the wall of the outer member. At the same time, the bearing surface of the locking member is reduced by a beveled surface to a thinner outer area which creates a space with the outer portion of the coupling groove, thus greatly simplifying insertion and removal of the locking member.

It is therefore a principal object of this invention to provide a quick connect-disconnect fluid coupling assembly that minimizes accidental disassembly.

It is a further object to provide a locking member that has improved bearing contact with the coupling.

It is another object to provide a locking member that is easily inserted into and removed from the assembly.

It is still another object to provide an improved method of assembling a fluid coupling system.

Other objects, uses and advantages of this invention are apparent from a reading of this description, which with reference to the accompanying drawings, which sets forth a complete explanation of the invention.

DESCRIPTION OF PREFERRED EMBODIMENTS

Figure 1:
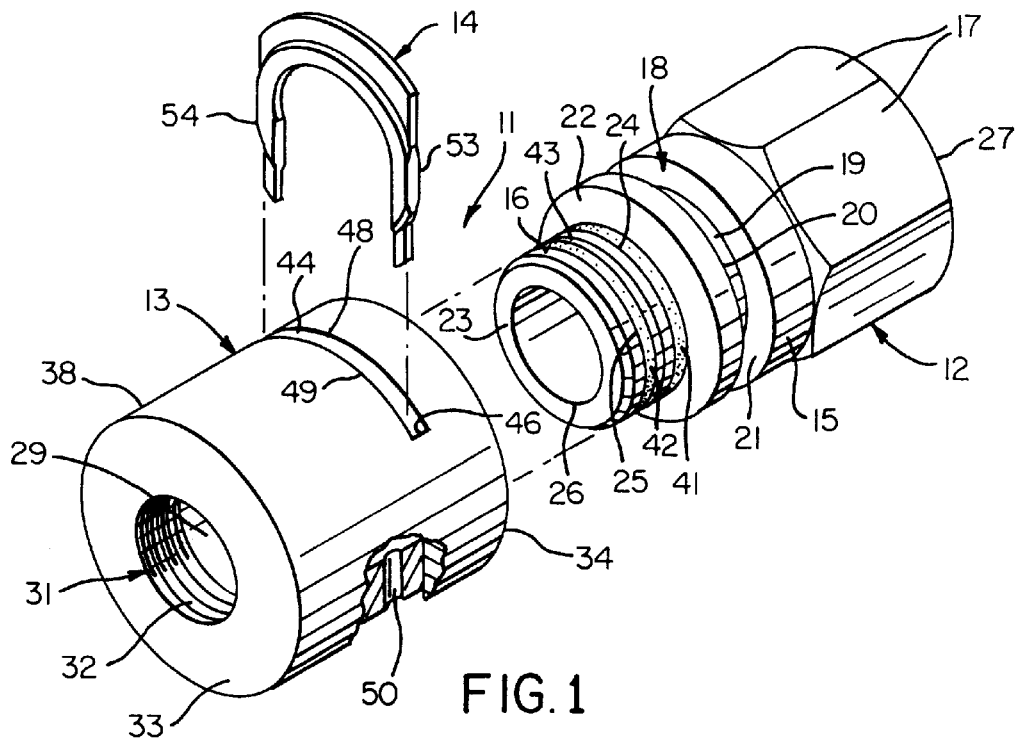
FIG. 1 is an exploded perspective view of the novel coupling assembly.

Referring now to the drawings, the novel coupling assembly is designated by reference numeral 11, and consists of the inner coupling member 12, the outer coupling member 13, and a retaining member or pin 14. The coupling is connected into a fluid conveying system which is not shown, since this system forms no part of the present invention.

The inner coupling member 12 has a generally cylindrical configuration consisting of a main body portion 15 and a reduced diameter body portion 16, in axial alignment. A portion of the main body portion is formed with a series of flat surfaces 17 which may be gripped by a wrench or similar tool. A large peripheral groove 18 is located in the main body portion 15, this groove being rectangular in cross-section and formed by an inner surface 19 and lateral surfaces 20 and 21 which have been cut into the body portion. It should be understood that this groove shape is merely exemplary, and may if desired be circular, triangular, or any other shape. A wall 22 interconnects the main body portion 15 and reduced diameter body portion 16, which terminates at one end, designated by reference numeral 23. Two spaced peripheral grooves 24 and 25 are located in the portion 16, the groove 24 being located at the intersection of the wall 22 and the reduced diameter body portion 16, this groove being generally semi-circular in cross-section. The other groove 25 is located farther along the body portion 16 toward the end 23, and is rectangular in cross-section. A central opening 26 extends completely through the coupling member 12 from end 23 to the opposite end 27. In the exemplary construction shown, the opening is threaded with threads 28 at end 27 to receive a mating part of the conduit system.

The coupling member 13 also is generally cylindrical and has a principal body 38, although the external dimensions of the member are not critical and could be a parallelepiped or other convenient shape. The internal construction, as illustrated, has a principal cylindrical bore 29 having a diameter which is generally contiguous with the reduced diameter body portion 16, and an enlarged cylindrical bore 30 in the principal body 38, which is generally contiguous with the main body portion 15. The bore 29 has a reduced diameter portion 31 which has threads 32 therein. The bore is continuous from threaded end 33 to the other end 34. A wall 35 interconnects the bores 29 and 30 and is generally contiguous with the wall 22 of the coupling member 12. A shoulder 36 is formed by the intersection of wall 35 and bore 29, and has a bevel 37 as shown so that its greater diameter is adjacent the walls.

The sealing members utilized in the invention include the principal members O-ring 42 and a "backup" ring 43, which are inserted in the peripheral groove 25 and provide the primary seal. The O-ring is generally of 70–90 Shore A hardness. The member 43 is formed of material having special properties such as a fluoroelastomer, nylon or other polymeric materials. Upon assembly of the coupling members, the rings 42 and 43 both contact and compress against the bore 29 to provide the required seal.

Figure 2:
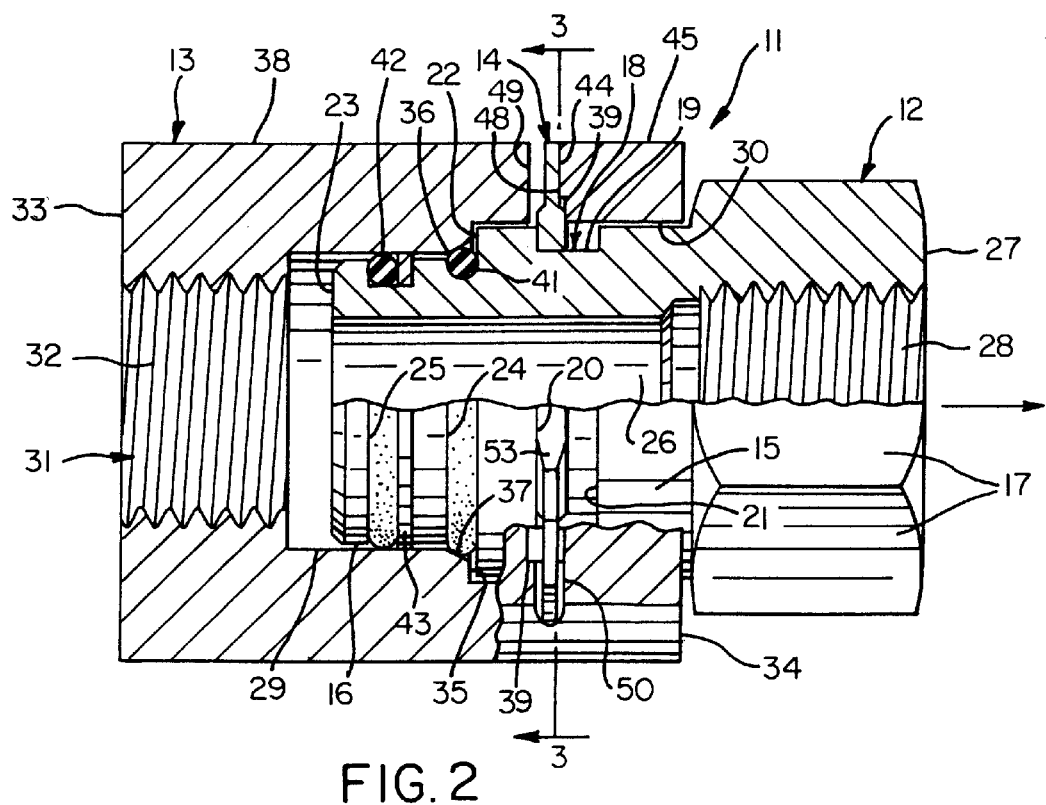
FIG. 2 is an enlarged view of the coupling assembly in partial cross-section.

The secondary sealing member 41 is preferably an O-ring which is soft and compressible and made of an elastomeric material such as rubber. The O-ring usually has a Shore A durometer hardness in the 30 to 50 range. This O-ring is inserted into the groove 24. When the coupling members are assembled as shown in FIGS. 2 and 4, the O-ring contacts and is partially compressed against the shoulder 36, with the bevel 37 ensuring that the O-ring will make proper contact between the two coupling members.

The basic construction described above is similar to the construction found in U.S. Pat. Nos. 4,431,218 and 4,811,975 referred to above. The disclosures of these patents are herein incorporated by reference.

A principal feature of the invention is the formation of a semi-circular slot 44 extending from the outer wall 45 through the principal body 38 and into the bore 30, defined in an axially direction by sides 48 and 49 which extend from the outer wall radially inward to the bore. The slot terminates at ends 46 and 47, which are approximately opposite each other on the body. The slot is approximately ¼ inch wide and extends for about 160° of the peripheral inner and outer surfaces outward of the horizontal axis H. The ends are thus approximately axially aligned with the peripheral groove 18 of the inner member. A groove 39 is formed in the inner surface of the outer member, so that the ends of the slot actually terminate in the slot. A pair of axially aligned openings 50 and 51 extend through the principal body 38 from the opposite surface 45 and into the bore 30, and extend into the groove 39 axially aligned with the ends of the slot, and thus opposite the groove 18 of the inner member. These openings are approximately ¼ inch in diameter, depending on design parameters.

Figure 4:
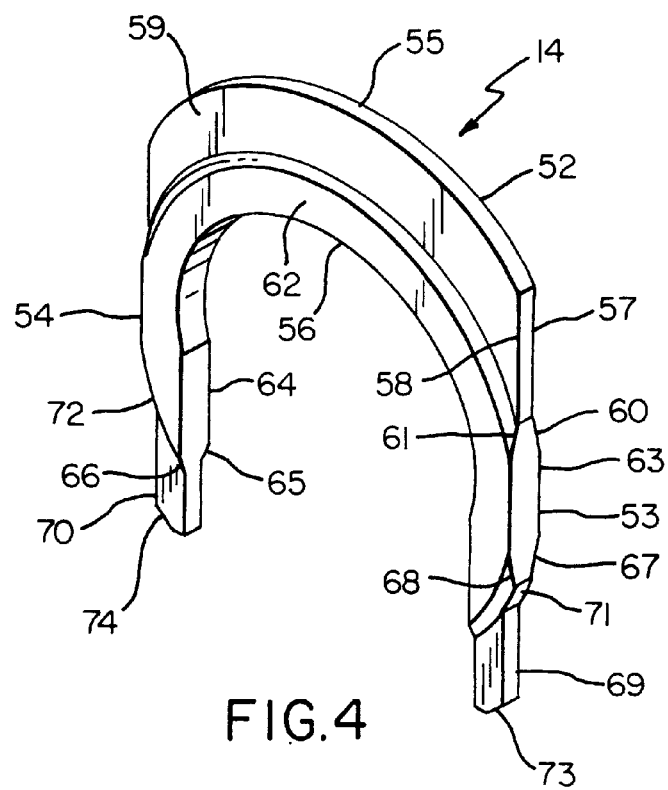
FIG. 4 is a perspective view of the novel locking member.

The retaining means 14 is detailed in FIG. 4, and is in the form of a unitary, one piece U-shaped locking member having a bight 52 and parallel legs 53 and 54 extending from the bight. The bight has a depth in a radial direction which extends from outer circular surface 55 to the parallel inner circular surface 56, and is formed of two walls 57 and 58 which are approximately ¼ inch apart at the outer portion 59, but are outwardly beveled on both sides at bevels 60 and 61 to form a thicker inner portion 62 on both sides, the thicker portion also extending along a portion of the legs at 63 and 64. The legs are inwardly beveled at bevels 65, 66, 67 and 68 on the faces parallel to the walls of the bight to create thinner ends 69 and 70, and are also beveled inwardly from their outer surfaces at 71 and 72 to reduce the thickness thereof in the other dimension. The endmost tips 73 and 74 of the legs are curved in a cylindrical arc at approximately the same radius as the outer circular surface 55.

Figure 3:
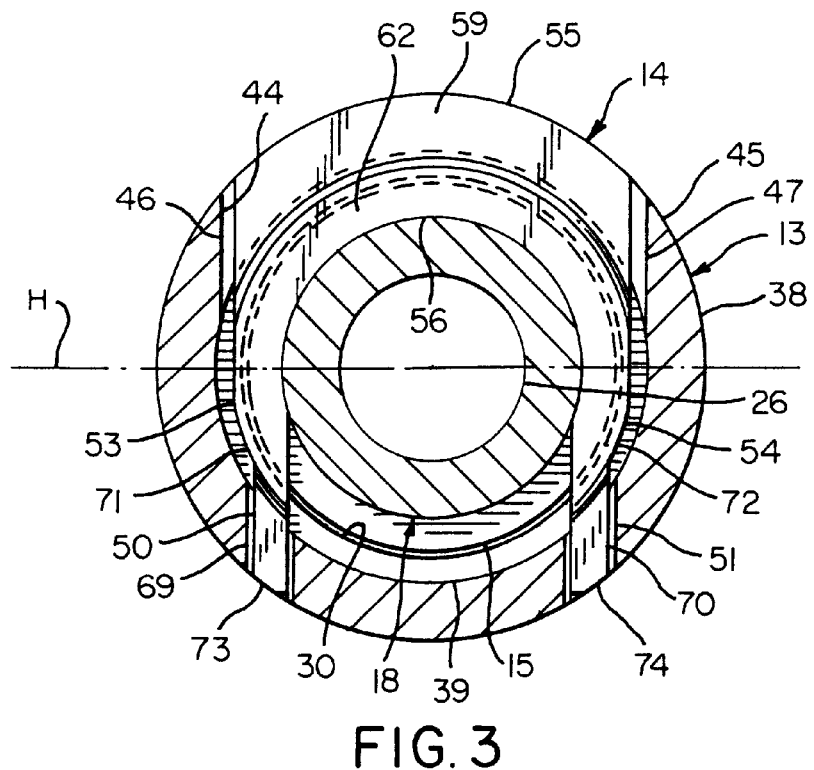
FIG. 3 is a view of the coupling assembly taken along lines 3—3 of FIG. 2, in cross-section.

The fluid coupling assembly is shown in FIGS. 2 and 3, whereby the exploded components of FIG. 2 are placed in assembled form. The inner member 12 is inserted into outer member 13 so that body portions 15 and 16 are contiguous with the bores 30 and 31. The sealing members 41, 42 and 43 are placed within the bore 29. In this relationship the groove 18 of the inner member is axially aligned with the slot 44 and the openings 50 and 51 of the outer member. The retaining member 14 is then inserted into the outer member by disposing the bight 52 into the slot 44 and the legs 53 and 54 into the openings 50 and 51. The legs are aligned with the ends 46 and 47 of the slot for snug entry.

The member 14 is pushed far enough so that the outer surface 55 of the bight is flush with and blends smoothly with the outer surface 45 of the outer member, thus preventing it from protruding beyond the surface and becoming subject to outside interference. At the same time, the ends 73 and 74 of the legs are flush with the opposite portion of the outer surface 45; preferably the curved surfaces fit with the curved cylindrical surface 45 so that these ends blend smoothly with the surface so they do not protrude therefrom. The insertion of the legs into the openings is eased by having the ends thereof slightly thinner at 69 and 70 so they slide smoothly into the openings. The bight of the retaining member has a vastly greater bearing surface than is found in prior art devices, because of the depth of the bight which extends between the outer and inner surfaces. The actual contact surface between the bight and the walls defining the slot is provided by the contact of the thicker inner portion 56 of the walls of the bight, which thus become bearing faces, with the side walls 48 and 49 of the slot, the contact thus extending along the entire walls of the slot and the walls of the bight. At the same time, the thicker portions 63 and 64 of the legs become bearing surfaces as they make contact with the walls which surround and define the openings 50 and 51 of the outer member. As the member 14 is disposed in the outer member, the legs are inserted into the peripheral groove 18 of the inner member to lock the entire assembly in place. As can best be seen in FIG. 3, the bearing faces 56 of the bight and bearing surfaces 63 and 64 of the legs create a much larger total contact surface with the outer member 13 than exists in prior art devices where the only contact surfaces are provided by the legs within the openings of the outer member. In the present invention, each bearing face of the bight and the corresponding bearing surface of the legs contacts a wall defining a slot and the surrounding wall of the openings to define a total surface contact of approximately 270 degrees along each common plane of such surface.

The assembly is unlocked by placing pressure on the ends 73 and 74 of the retaining member 14, and forcing them outward. The pressure frees the legs from the openings and the bight from its contact with the walls of the slot. This process is eased by the fact that the outer portion 59 of the bight is thinner than the inner portion 62, and the beveled or chamfered transition areas 60 and 61 between the outer and inner portions.

MODIFICATION

Figure 5:
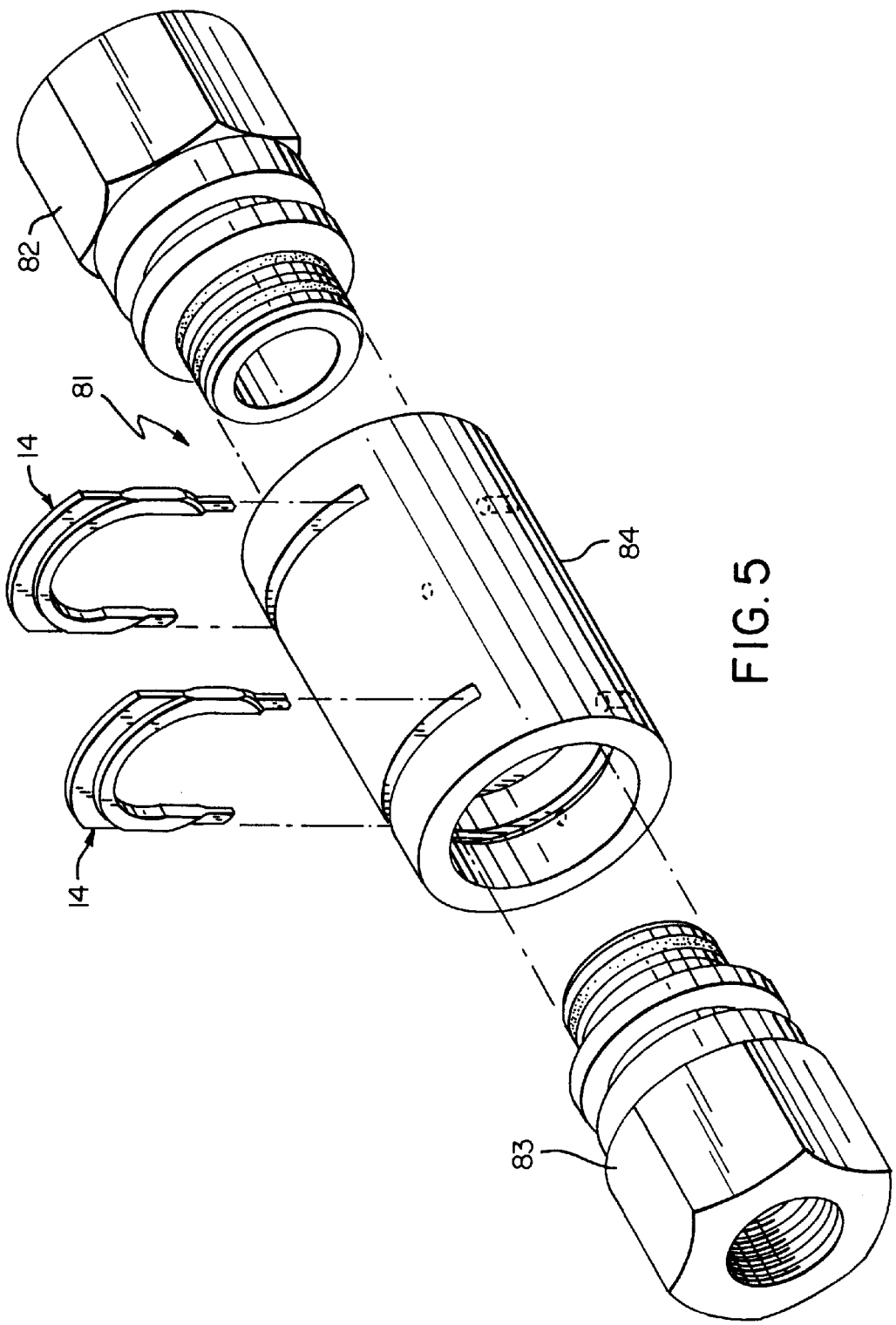
FIG. 5 is an exploded perspective view of a modification of the assembly of FIGS. 1–3.

FIG. 5 illustrates a modified form of the invention wherein the novel concept may be used to provide interlocking of multiple coupling members. The fluid coupling assembly 81 consists of two inner coupling member 82 and 83, and outer coupling member 84, all of which may be similar to the coupling member 12 and 13. Alternatively, these may be similar to the coupling members which are the subject of the above-referenced U.S. Pat. No. 4,707,262, and its division, U.S. Pat. No. 4,806,248 (of common assignment), issued to Murken. In this form of the invention, two retaining members 14 may be used to interlock the assembly in a similar manner. It should be understood that three or more inner coupling members, and two or more outer coupling members, plus additional locking members, may be utilized to form more complex assemblies by using similar coupling systems.

While the embodiments shown herein are only exemplary, it should be understood that other forms of the invention fall within the scope of this description and the claims which are appended hereto.

What is claimed is:

1. A fluid coupling assembly comprising inner and outer coupling members and retaining means for interlocking said members; said inner coupling member having a generally cylindrical configuration comprising a main body portion, a reduced diameter body portion having a peripheral surface, and a first wall extending radially of and intersecting said portions, said main body portion having a peripheral groove therein; said outer coupling member being positioned over said first coupling member and having a principal cylindrical bore generally contiguous with said reduced diameter body portion, and a principal body having an enlarged diameter bore generally contiguous with said main body portion;

the improvement comprising a slot extending through a portion of said principal body of said outer member, said slot opposite and aligned with said peripheral groove on said inner member, a pair of axially aligned openings extending through said principal body of said outer member opposite to and axially aligned with said slot; said retaining means comprising a U-shaped locking member having a bight and parallel legs extending therefrom, said bight being disposed within said slot and said legs inserted within said openings, at least a portion of both said bight and said legs being inserted into said peripheral groove of said inner member to interlock said inner and outer members.

2. The fluid coupling assembly of claim 1 further comprising a peripheral groove in the inner surface of said principal body of said outer member, said slot having ends terminating in said groove and said openings extending into said grooves and being axially aligned with said ends.

3. The fluid coupling assembly of claim 2 wherein a portion of said bight is also disposed in said peripheral groove of said principal body.

4. The fluid coupling assembly of claim 3 wherein said bight extends inwardly of said peripheral groove of said principal body to be inserted into said peripheral groove of said inner member.

5. The fluid coupling assembly of claim 1 wherein said outer member has a cylindrical outer surface and said bight of said locking member has an outer generally arcuate surface, said outer arcuate surface being aligned with said cylindrical outer surface of said outer member and being flush therewith.

6. The fluid coupling assembly of claim 5 wherein said legs of said locking member terminate in ends having an arcuate configuration, said ends being aligned with said cylindrical outer surface of said outer member and being flush therewith.

7. The fluid coupling assembly of claim 1 wherein said slot is defined by opposing walls, said bight having opposite bearing faces defining a wall thickness at right angles to said faces, one portion of said bearing faces having a greater thickness than the remaining portion thereof, said greater thickness portion contacting said opposing walls of said slot for said interlock.

8. The fluid coupling assembly of claim 7 wherein said openings are defined by surrounding walls, said legs having bearing surfaces in the same plane as said bearing faces of said bight and have the same thickness as said greater thickness portion of said bight, said bearing surfaces of said legs contacting said surrounding walls for said interlock.

9. The fluid coupling assembly of claim 8 wherein said principal body of said outer member and said locking member have a common plane of contact providing contact surfaces of approximately 270 degrees therebetween.

10. The fluid coupling assembly of claim 9 wherein said common plane of contact is defined between one of said bearing faces of said bight with one of said opposing walls of said slot, and one of said bearing surfaces of said legs with said surrounding walls of said openings.

11. A fluid coupling comprising a plurality of inner coupling members and an outer coupling member and retaining means for interlocking said outer coupling member to said inner coupling members; each of said inner coupling members having a generally cylindrical configuration comprising a main body portion, a reduced diameter body portion having a peripheral surface, and a first wall extending radially of and intersecting said portions, said main body portion having a peripheral groove therein; said outer coupling member being positioned over said first coupling member and having a principal cylindrical bore generally contiguous with said reduced diameter body portion, and a principal body having an enlarged diameter bore generally contiguous with said main body portion;

the improvement comprising a plurality of slots extending through said principal body of said outer member, said slots opposite and aligned with said peripheral grooves on said inner member, a plurality of pairs of axially aligned openings extending through said principal body of said outer member opposite to and axially aligned with each of said slots; said retaining means comprising a plurality of U-shaped locking members each having a bight and a pair of parallel legs extending therefrom, each of said bights being disposed within one of said slots and the corresponding pair of said legs inserted within one of said openings, at least a portion of each of both said bight and said legs being inserted into said peripheral groove of one of said inner members to interlock said one of said inner members with said outer member.

12. A fluid coupling assembly comprising inner and outer coupling members and retaining means for interlocking said members; said inner coupling member having a generally cylindrical configuration comprising a main body portion, a reduced diameter body portion having a peripheral surface, and a first wall extending radially of and intersecting said portions, said main body portion having a peripheral groove therein; said outer coupling member being adapted to be positioned over said first coupling member and having a principal cylindrical bore generally contiguous with said reduced diameter body portion, and a principal body having inner and outer surfaces and an enlarged diameter bore generally contiguous with said main body portion;

the improvement comprising a slot extending through a portion of said principal body of said outer member, said slot opposite and aligned with said peripheral groove on said inner member, a pair of axially aligned openings extending through said principal body of said outer member opposite to and axially aligned with said slot, said slot and said openings being adapted to receive said retaining means to interlock said inner and outer members, a peripheral groove in said inner surface of said principal body of said outer member, said slot having ends terminating in said groove, and said openings extending into said grove and being axially aligned with said ends.

13. The fluid coupling assembly of claim 12 wherein said peripheral groove of said principal body is adapted to receive a portion of said retaining means.

14. The fluid coupling assembly of claim 12 wherein said retaining means comprises a bight and parallel legs extending therefrom, said peripheral groove of said principal body being adapted to receive said portion of said retaining means.

15. The fluid coupling assembly of claim 14, wherein said bight has an arcuate outer surface, said outer member having a cylindrical outer surface and being adapted to be aligned with said outer surface of said bight to be flush therewith.

16. The fluid coupling assembly of claim 14 wherein said cylindrical outer surface of said outer member is adapted to be flush with the ends of said legs.

17. A U-shaped unitary locking member for interlocking inner and outer members of a fluid coupling assembly, comprising a bight and two parallel legs having free ends extending therefrom, said bight and said legs having opposite faces, said bight and said legs having a thickness at right angles to said faces, said bight having inner and outer generally parallel arcuate surfaces defining a radial depth of said faces, said legs having a width in the plane of said faces, said radial depth of said bight having a greater depth than said width of said legs, a portion of said bight being thicker than the remaining portion of said bight, said thicker portion of said bight comprising opposite bearing faces beveled to the faces of said remaining portion.

18. The locking member of claim 17 wherein said thicker portion of said bright is radially inward of said remaining portion.

19. The locking member of claim 17 wherein said faces are symmetrical.

20. The locking member of claim 17 wherein said legs have bearing surfaces in the same plane as said bearing faces of said bight.

21. The locking member of claim 20 wherein said free ends of said legs have a narrower width than said bearing surfaces thereof.

22. The locking member of claim 20 wherein said free ends of said legs have arcuate tips.

23. In a method of forming a fluid coupling assembly comprising inner and outer coupling members and a U-shaped retaining means having a bight and parallel legs extending therefrom; said inner coupling member having a generally cylindrical configuration comprising a main body portion, a reduced diameter body portion having a peripheral surface, and a first wall extending radially of and intersecting said portions, said main body portion having a peripheral groove therein; said outer coupling member being adapted to be positioned over said first coupling member and having a principal cylindrical bore generally contiguous with said reduced diameter body portion, and a principal body having an enlarged diameter bore generally contiguous with said main body portion;

the improved steps of forming a slot within a portion of said principal body of said outer member, aligning said slot opposite said peripheral groove on said inner member, forming a pair of axially aligned openings through said principal body of said outer member opposite to and axially aligned with said slot, inserting said retaining means into said outer member by disposing said bight within said slot and inserting said legs within said openings, and inserting at least a portion of both of said bight and said legs into said peripheral groove of said inner member to interlock said inner and outer members.

24. In the method of claim 23 wherein said principal body of said outer member has a peripheral groove in the inner surface thereof, the further steps of terminating the ends of said slot in said groove, extending said legs into said peripheral groove, and axially aligning said legs with said ends.

25. In the method of claim 24, the further steps of disposing a portion of said bight in said peripheral groove of said principal body.

26. In the method of claim 23, the further steps of extending said bight inwardly of said peripheral groove of said principal body, and subsequently inserting said bight into said peripheral groove of said inner member.

27. In the method of claim 23, wherein said outer member has a cylindrical outer surface and said bight of said retaining means has an arcuate outer surface, the further steps of inserting said retaining means so that said arcuate outer surface is flush with said cylindrical outer surface of said outer member.

28. In the method of claim 27 including the further step of inserting said retaining means so that the ends of said legs are flush with said cylindrical outer surface of said outer member.

29. In the method of claim 27 wherein said slot is defined by opposing walls, the further steps of forming said bight with opposite faces defining a thickness at right angles to said faces, forming one portion of said faces with a greater thickness than the remaining portion thereof to provide bearing faces, and causing said bearing faces to contact said opposing walls of said slot for said interlock.

30. In the method of claim 29 wherein said openings are defined by surrounding walls, the further step of forming bearing surfaces on said legs in the same plane as said bearing faces of said bight and having the same thickness as the thickness of said bight, and causing said bearing surfaces to contact said surrounding walls of said openings for said interlock.

31. In the method of claim 30 including the further step of providing a total contact surface of approximately 270 degrees between said principal body of said outer member and said bearing faces of said bight and said bearing surfaces of said legs.

\* \* \* \* \*